United States Patent [19]

Sato et al.

[11] 4,251,134
[45] Feb. 17, 1981

[54] BAYONET SAFETY MECHANISM FOR CAMERA LENS MOUNT

[75] Inventors: Akira Sato, Ohme; Takashi Isobe, Tokyo, both of Japan

[73] Assignee: Canon Kabushiki Kaisha, Tokyo, Japan

[21] Appl. No.: 79,371

[22] Filed: Sep. 27, 1979

[51] Int. Cl.³ .............................................. G02B 7/02
[52] U.S. Cl. .................................... 350/257; 354/286
[58] Field of Search ................. 350/252, 257; 354/286

[56] References Cited

U.S. PATENT DOCUMENTS 3,906,534 9/1975 Shirasaki ........................... 350/257 X

FOREIGN PATENT DOCUMENTS 2804459 8/1978 Fed. Rep. of Germany ........... 354/286

Primary Examiner—F. L. Evans
Attorney, Agent, or Firm—Toren, McGeady and Stanger

[57] ABSTRACT

In a camera employing a bayonet mechanism for mounting and dismounting an interchangeable lens assembly, mounting of the lens assembly upon the camera in a misaligned position is prevented by a safety mechanism which is arranged to inhibit bayonet coupling between the bayonet mechanism of the lens and the complementary bayonet mechanism of the camera when the lens assembly is tilted or otherwise incorrectly positioned relative to the camera.

8 Claims, 8 Drawing Figures

BAYONET SAFETY MECHANISM FOR CAMERA LENS MOUNT

BACKGROUND OF THE INVENTION

The present invention relates generally to cameras and more specifically to a mounting system whereby an interchangeable lens assembly may be mounted and dismounted to and from operative position on the camera. More specifically, the invention relates to a lens mounting system involving bayonent mechanisms including bayonet coupling means on the lens assembly and complementary bayonet coupling means on the camera which are brought to engaged and disengaged positions during mounting and dismounting of the lens assembly.

A bayonet device which is used for mounting a lens assembly on a camera is usually arranged to effect coupling of the relative bayonet devices on the lens assembly and on the camera by interlocking engagement of claws of each of the bayonet members of the lens assembly and of the camera. Usually, the claws of the lens assembly are introduced into cutaway parts located between the claws of the complementary bayonet coupling means on the camera with rotation of the lens claws causing them to be brought behind the inner side of the claws on the camera bayonet mechanism for interlocking engagement. Thus, the lens assembly may be tightly mounted by appropriate rotation of the lens assembly bayonet coupling mechanism while it is in proper position relative to the complementary camera bayonet coupling means.

Generally, the bayonet members involved are provided with two to four or more claws and a corresponding number of cutaway parts. The optical axis of the lens barrel and the optical axis of the camera are brought into coinciding relationship with each other by mating of the claw and cutaway parts of the lens assembly bayonet mechanism with those of the complementary bayonet mechanism on the camera.

Furthermore, a lens assembly and a bayonet mechanism of a camera are generally provided with referenced positioning parts which indicate the correct mounting position of the lens assembly relative to the camera in order to insure that signal transmission members of the lens assembly and complementary parts of the camera which must be brought into engagement therewith will be accurately related with each other so that exposure control signals will be accurately transmitted between the camera and the lens assembly. In mounting the lens assembly on the camera, certain mounting faces of the various parts must be maintained parallel with each other. However, it will be found that due to looseness or inaccuracy of the dimensions of the bayonet coupling means of the lens assembly and of the camera, misaligned mounting may occur. For example, it may be possible to effect misaligned mounting of the lens assembly with the lens axis tilted relative to the camera axis. This, of course, may cause damage to the claws of the bayonet mechanism in that excessive force may result in bending of the parts. Further, the probability of misaligned bayonet coupling of conventional bayonet devices is difficult to eliminate even when a mounting device such as that of the type disclosed in U.S. Pat. No. 3,906,534 is used. This type of mounting device is known as a spigot bayonet mount but it has nevertheless been found to provide less than acceptable results.

Accordingly, it is an object of the present invention to provide a safety mechanism for a bayonet coupling device of a camera which insures that an interchangeable lens assembly will be mounted in correct position on the camera.

It is another object of the invention to provide a safety mechanism for a bayonet device which will protect the bayonet device from being damaged by incorrect mounting action of the interchangeable lens upon the camera.

A further object of the invention is to provide a bayonet device for an interchangeable lens assembly which will insure correct mounting of the lens upon the camera in order to permit accurate transmission of exposure information therebetween.

SUMMARY OF THE INVENTION

Briefly, the present invention may be described as a lens assembly for a camera comprising lens barrel means having operative components of the camera lens assembly mounted thereon, bayonet coupling means adapted to be engaged and disengaged with complementary bayonet coupling means on said camera upon relative rotation therebetween for operatively mounting and dismounting said lens assembly and said camera, and means for impeding the mounting of the lens assembly on the camera when the lens assembly is misaligned relative to the camera during the mounting operation, the impeding means comprising a plurality of projecting members provided at a position to abut against the complementary bayonet coupling means of the camera to prevent mounting interengagement of the bayonet coupling means of the lens assembly with the complementary bayonet coupling means of the camera when the lens assembly is misaligned relative to the camera.

The impeding means may comprise pin means located behind the bayonet claws of the lens assembly and spaced from the inner side of the claws of the lens assembly a distance to define a gap therebetween through which the bayonet claws of the complementary bayonet coupling means of the camera must pass for interlocking engagement, the pin means being located to define the gap with a size to prevent mounting of the lens assembly when the lens assembly is not held in the required aligned position relative to the camera.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
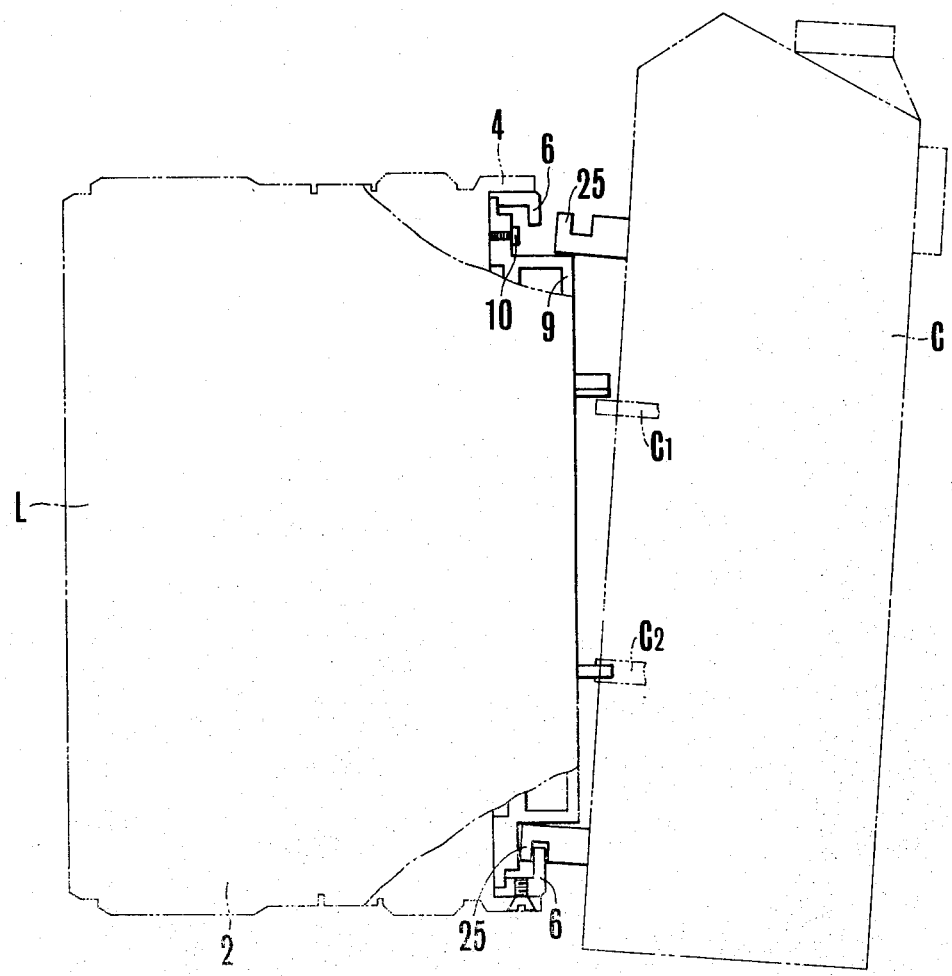
FIG. 1 is a highly schematic side view depicting the relative positions of the lens assembly and the camera during an attempt to couple the parts while they are misaligned.

Referring now to the drawings wherein similar parts are identified with like reference numerals throughout the various figures thereof, there is illustrated in FIG. 1 the type of problem sought to be avoided by the present invention. In FIG. 1 there is schematically depicted a camera C and an interchangeable lens assembly L with FIG. 1 depicting the manner whereby misalignment during mounting may occur. The lens assembly L comprises a bayonet mechanism 6 including bayonet claws and the camera C includes a complementary bayonet mechanism 25 including bayonet claws adapted to be interengaged with the claws of the bayonet mechanism 6. As shown in FIG. 1, the engagement of the bayonet claws 6 and 25 is sometimes effected with the camera C and the lens barrel L in slanted positions relative to each other. When disengaging the claws in such a case, the claw and cut-away parts have sometimes been bent by excessive forces exerted thereupon.

Figure 3A:
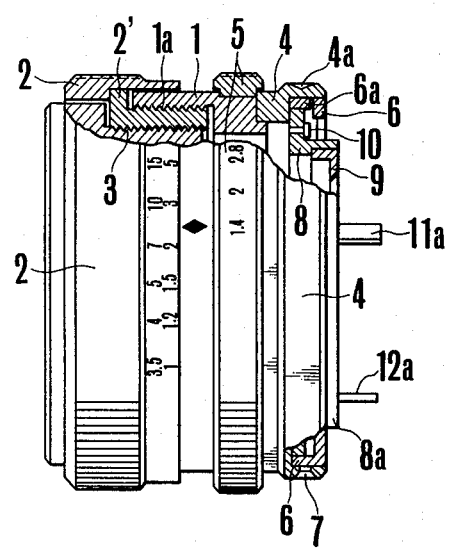
FIG. 3A is a sectional view partially broken away showing essential parts of the lens assembly with which the present invention is utilized.
Figure 3B:
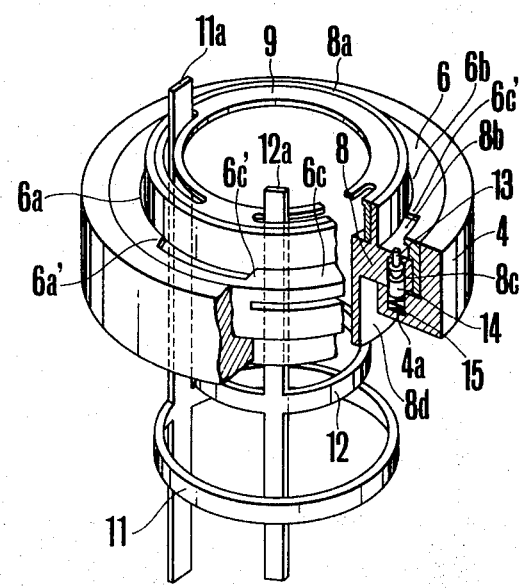
FIG. 3B is a perspective view partially broken away and partially sectioned showing essential parts of the lens assembly of FIG. 3A.

FIGS. 3A and 3B illustrate a lens assembly of the type with which the present invention is utilized having a mounting device which is adaptable for application with the bayonet device of the present invention. As shown in FIGS. 3A and 3B, a lens barrel 1 is formed of an annular shape and is provided with a threaded inner surface 1a on the inside of the forward end thereof. A focal distance adjustment or focusing ring 2 is formed into one unified body with an intermediate helicoid ring 2' which engages the threaded engagement face of the lens barrel 1. The focusing ring 2 is arranged to move a front lens group (not shown) by means of a known helicoid screw 3. At the rear end of the lens barrel 1 there is provided a bayonet mount carrying ring 4 which is secured to the lens barrel 1 and is formed integrally with the body of the barrel 1. An engraved or reference indicia 4a provided on the outer circumference of the carrying ring 4 indicates a reference mounting position for the lens assembly.

Between the lens barrel 1 and the bayonet mount carrying ring 4 there is provided a recessed ring part. A stop ring of a known type which is interlocked with a diaphragm device provided with the lens barrel 1 is rotatably fitted in the recessed ring part. A bayonet member 6 is fitted in a stepped part of the rear opening of the carrying ring 4 and it is arranged to perform a tightening action upon the bayonet member 6 to effect engagement of the bayonet member 6 with the bayonet member 25 disposed upon the camera, as previously described. The bayonet member 6 is prevented from slipping off by a bent part provided at the end of the carrying ring 4 and it is secured to the carrying ring 4 by screws 7 in a shape unified with the ring 4.

Figure 4:
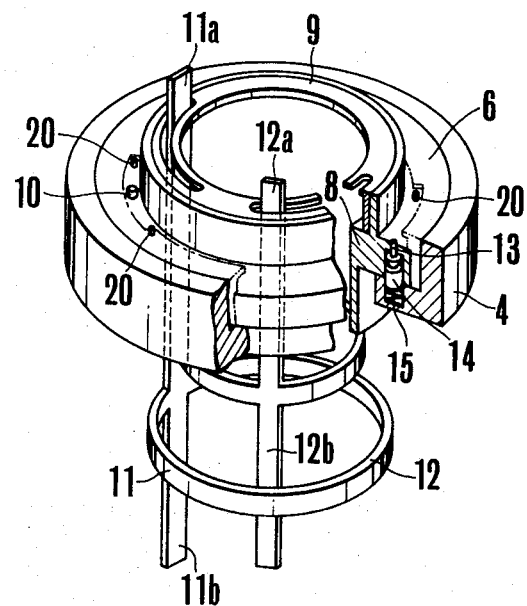
FIG. 4 is a perspective view showing essential parts of a lens assembly constituting an embodiment of the present invention.

The lens assembly also includes an adapter member 8 which is rotatably fitted into a recessed annular part between the carrying ring 4 and the bayonet member 6. The rear part of the adapter 8 is cylindrically formed to serve as a reference fitting diameter part 8A. A position determining pin 10 is provided upon a mounting reference face of the adapter 8 and it is arranged to lock the adapter 8 relative to the camera when the lens device is mounted on the camera. The pin 10 is adapted to engage within a slit (not shown) formed on one of the bayonet claws of the complementary bayonet coupling means 25 of the camera. With the pin engaged in the slit, the ring 4 and the balance of the lens assembly may be rotated relative to the camera and relative to the adapter 8 in order to effect mounting of the lens assembly upon the camera. The bayonet member 6 is provided with bayonet claws 6b, 6c and 6d which are angularly spaced at intervals of 120°, as shown in FIG. 4. The adapter member 8 is maintained in rotatively locked engagement with the ring 4 and with the other components of the lens assembly by an interlocking mechanism which includes a pin 13 which protrudes from an annular face of the adapter member 8. As best seen in FIG. 3B, the pin 13 will protrude from an aperture in an annular face 8b of the adapter member 8 when the lens assembly is dismounted from the camera thereby to hold the adapter 8 and the balance of the parts of the lens assembly in fixed rotative engagement. The pin 13 is, however, moved in the direction of the optical axis of the lens barrel by abutment against a part of the camera when mounting of the lens assembly is effected. A locking pin 14 is fitted together with a pressing spring 15 into a groove provided in a part of the carrying ring 4 in alignment with the pin 13. When the lens assembly is to be mounted upon the camera, the pin 13 is recessed against the locking pin 14 and against the force of the spring 15 and by proper interface between the pin 14 and the faces of the adapter 8 and of the ring 4, the adapter 8 and the ring 4 are released for relative rotative movement therebetween during mounting of the lens assembly on the camera. As a result, rotation of the ring 4 and of all of the other parts of the lens assembly which are rotatively fixed relative thereto will cause the bayonet coupling means 6 to become engaged with the complementary bayonet coupling means on the camera while the adapter 8 is held stationary relative to the camera by the pin 10.

A slot groove 6a is provided in the sidewall of each of the claws 6b, 6c and 6d of the bayonet mechanism 6. The bayonet claws are thus arranged to display some resiliency in the direction of the optical axis of the lens assembly. When the lens is mounted upon the camera body, the bayonet claws 6b, 6c and 6d will engage with the claws of the bayonet mechanism 25 which is provided on the camera, as indicated in FIG. 1.

An aperture signal transmitting member 11 is rotatably carried either by the lens barrel 1 or by the carrying ring 4 and it is urged in a given direction by a spring member (not shown). The rear end part of the aperture signal transmitting member 11 is interlocked with a stop ring 5 and the diaphragm device to transmit an aperture signal of the lens barrel or with that of the camera to the camera or to the lens barrel.

A diaphragm drive member 12 is carried by the adapter member 8 and it is rotatable around the optical axis of the lens assembly. A release operation of the camera shutter mechanism would cause the diaphragm drive member 12, by engagement of the end 12a of the member 12 by a control member of the camera, to drive a diaphragm device or an aperture presetting device. The diaphragm drive member 12 is urged by a spring member (not shown) to rotate in a given direction around the optical axis of the lens assembly.

FIG. 4 is a perspective view showing the lens barrel of FIG. 3B with the bayonet member 6, the member 11, the drive member and lock means 13, 14 and 15 but with the bayonet member 6 shown in mounting position in dotted form.

In the embodiment of FIG. 4, there are provided six protruding pin members 20 for preventing the lens assembly from being mounted on the camera in a misaligned position. When the bayonet mechanism 25 provided on the camera is bayonet-coupled with the bayonet mechanism 6 provided on the lens assembly, with the claws of one bayonet mechanism engaging with those of the other bayonet mechanism, if the mounting position of the lens assembly is incorrect or if the lens assembly is in a tilted posture relative to the camera, the protruding pin members 20 will hit against the bayonet mechanism 25 of the camera in order to inhibit the mounting operation and to prevent it from being performed. The protruding pins 20 are arranged to be on the lens mounting reference face of the adapter member 8 and they are arranged to be in corresponding position to the corner parts 6a', 6b' and 6c' of the claws 6b, 6c and 6d of the bayonet member 6 shown in FIG. 3B when the lens assembly is positioned for mounting with the aforementioned lock means in a locked state, i.e. the position of the adapter member 8 relative to the carrying ring 4 or the lens barrel 1 is locked by the locking means.

It is preferable if the distance l2 between adjacent protruding pins 20a and 20b is formed to be larger than the width l3 of the claws of the bayonet mechanism 25 provided on the camera and if it is smaller than the width l1 of the cut-away parts of the bayonet member 6 of the lens barrel. Furthermore, the spacing distance l2 of the protruding pins 20 may be arranged in accordance with the following relationship.

$$l1 \geq l2 \geq l3$$

In accordance with the invention, as described in the foregoing, the protruding pins 20 will be provided at parts where the bayonet claws 6a engage the cut-away parts provided on the camera and when any attempt is made to mount the lens assembly in a slanted position relative to the camera as is shown for example in FIG. 1, the protruding pins 20 will abut against the corner parts of the bayonet mechanism 25 on the side of the camera to inhibit the bayonet claws of the lens barrel from engaging the bayonet cut-away parts of the camera so that incorrect engagement as represented in FIG. 1 can be prevented to eliminate the possibility of malfunctions such as causing the bayonet member to be bent by incorrect alignment.

The protruding pins 20 in the aforementioned embodiment may be formed integrally with the adapter member 8 by appropriate manufacturing techniques which will lower the cost of manufacture.

Figure 2:
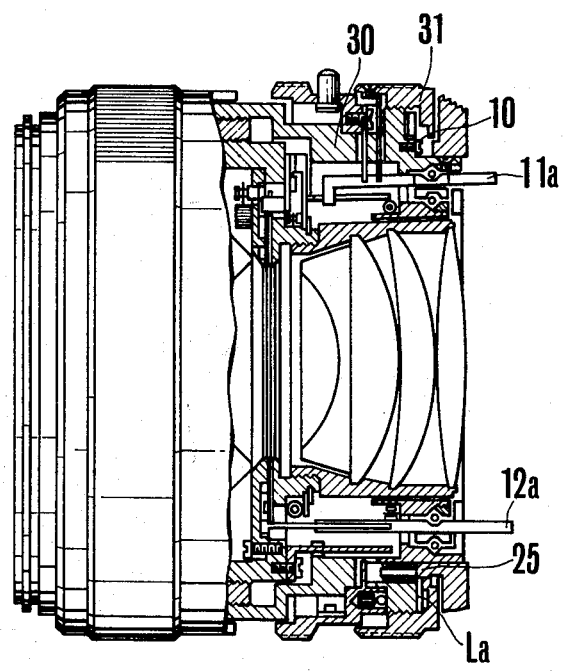
FIG. 2 is a sectional view partially broken away showing an overall lens assembly having a bayonet coupling means of the type to which the present invention relates.

In a further embodiment of the invention, the mounting method illustrated in FIG. 2 is employed. There is provided a tightening ring 31 which is rotatably screwed on to the fixed part 30 of the lens barrel. Bayonet claws and cutaway parts formed by this tightening ring are arranged to engage the bayonet 25 which is provided on the camera. Coupling between the bayonet of the lens and the bayonet of the camera is effected by turning the tightening ring. In this embodiment the so-called spigot bayonet structure is utilized with regard to this particular embodiment of the invention.

In this embodiment, there are provided, between the tightening ring and the fixed parts of the lens barrel, a plurality of locking means arranged such that, before the lens barrel is mounted on the camera, the signal members 11a and 12a of the lens barrel will be in normal reference positions relative to the camera. Furthermore, in dismounting the lens barrel from the camera, the bayonet of the tightening ring 31 is allowed to disengage from the bayonet of the camera when the signal members 11a and 12a come into position at which they can be correctly engaged with the camera body during the next mounting operation. These locking means are arranged in positions where unlocking thereof may be effected by the bayonet claws of the camera when the lens barrel is mounted on the camera body. However, unlocking cannot be effected in cases where mounting of the lens barrel is attempted with the lens assembly in a tilted posture as shown in FIG. 1. In such a case, therefore, a tightening operation on the tightening ring cannot be performed so that the lens barrel will not be coupled with the camera in an incorrect manner.

The structural arrangement of this embodiment may be described by reference to FIG. 6 wherein parts performing the same function as those corresponding to parts in FIGS. 1-5 are indicated by similar reference numerals in FIG. 6. A tightening ring 31 is rotatably screwed onto a fixed part of the lens barrel. The tightening ring 31 is provided with bayonet claws 31a, 31b and 31c (not shown) and with cut-away parts 31d, 31e and 31f (also not shown). These bayonet claws and cut-away parts are arranged to engage the bayonet claws and cut-away parts of the camera. Between the tightening ring 31 and an adapter member 8, there are provided at least two locking devices each arranged with a spring member 32 and a lock pin 33 fitted into a hole provided in the adapter member 8. The lock pin 33 moves into a recessed part 31g provided in the tightening ring 31 to interlock the tightening ring 31 with the adapter member 8. A part of each lock pin 33 protrudes from the circumferential edge of a bayonet cutaway part of the tightening ring and is thus arranged to be pushed by a claw of the camera toward the side of the hole of the adapter member 8 in order to release the tightening ring from its locked position and thereby to permit coupling of the lens assembly with the camera body. In this embodiment, a plurality of the aforementioned locking devices are arranged to release the tightening ring 31 from its locked position in order to enable rotation thereof only when the lens assembly and the camera are to be attached to each other with their bayonet parts in parallel relationship so that correct alignment can be insured between the lens assembly and the camera in order to prevent the bayonet from being damaged by bending or the like.

Figure 6:
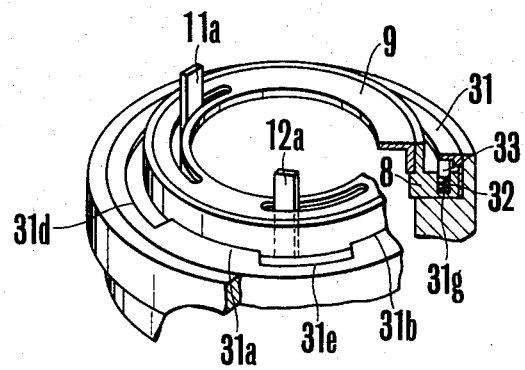
FIG. 6 is a perspective view partially broken away and partially in section showing essential parts of a different embodiment of a lens assembly utilizing the present invention.

It should be noted that the embodiment of FIG. 6 differs from the embodiment of FIG. 3b in that in the embodiment of FIG. 6 only the tightening ring 31 is rotated relative to the lens assembly, with all of the other parts of the lens assembly remaining stationary relative to the camera during mounting. Thus, in the embodiment of FIG. 6 not only is the adapter 8 retained in locked rotative position relative to the camera, but also all of the other parts of the lens assembly are maintained rotatively locked with only the tightening ring 31 being turned.

Contrary to this mode of operation, the embodiment of FIG. 3b enables the lens assembly to be grasped at any part of its length since only the adapter member 8 must remain stationary and since rotation of any of the other parts of the lens assembly relative to the camera and relative to the adapter 8 will cause the bayonet member 6 to turn relative to the bayonet member 25 for locking and unlocking operation.

Figure 5:
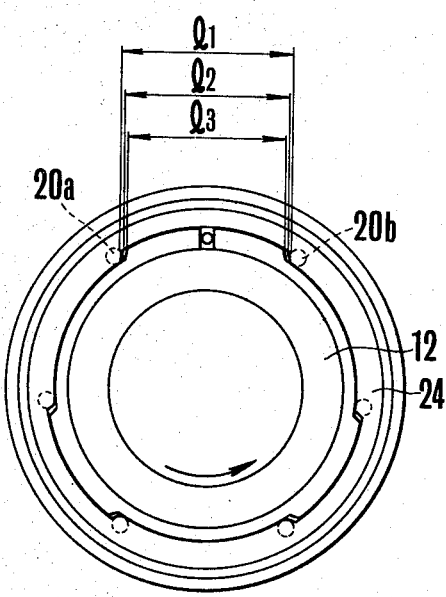
FIG. 5 is an illustration showing the coupling faces of the lens assembly of the invention and a complementary coupling face of a camera upon which the lens assembly may be mounted.
Figure 7:
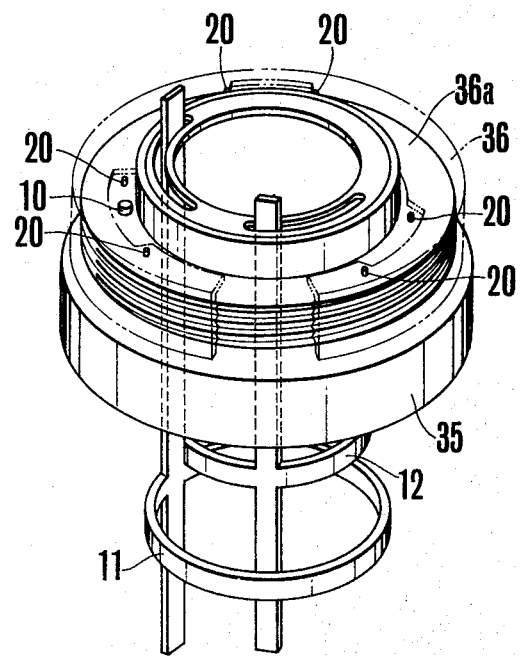
FIG. 7 is a perspective view showing essential parts of a further embodiment of the invention.

A further embodiment of the invention relates to a safety arrangement for a bayonet device of the type disclosed in U.S. Pat. No. 3,906,534 wherein there is provided a tightening ring 31 which is movable in the direction of the optical axis of the lens assembly which is arranged in the same manner as that previously described. A lens assembly is mounted and secured to a camera by means of bayonet claws of a bayonet coupling means provided at one end of the tightening ring 31. The structural arrangement of this embodiment is shown in FIG. 7 wherein a lens barrel 31 which carries means such as an automatic aperture adjusting mechanism for maintaining the interlocking relationship of the aforementioned signal transmitting members 11 and 12 is provided. A tightening ring 36 screwed to a mounting part of the lens barrel 35 is disposed on the side facing the camera. The tightening ring is arranged to be moved by a helicoid device in the direction of the optical axis as is illustrated in phantom line (dot-chain line) in FIG. 7. On the mounting face of the lens barrel 35 at which the lens barrel is to be mounted on the camera, there is provided a pin 10 which engages an engaging means provided on the camera which is arranged to define the position of the lens assembly relative to the camera. In addition to this pin, there are provided a plurality of pin joggles 20 on the mounting face of the lens barrel 35. These pin joggles 20 are disposed in positions corresponding to the claws of the bayonet ring 36a of the tightening ring and they are arranged to prevent the lens barrel 35 from being incorrectly mounted on the camera. With these pin joggles so arranged, if the interchangeable lens is handled to be mounted with a tilted posture relative to the camera, the pin joggles 20 will abut the bayonet claws of the coupling means on the camera so that incorrect mounting would be prevented. Further, it is preferable to arrange the claws of the bayonet ring 36a of the tightening ring 36 and the aforementioned pin joggles 20 to be arranged in the same positional relationship as is indicated in FIG. 5.

While specific embodiments of the invention have been shown and described in detail to illustrate the application of the inventive principles, it will be understood that the invention may be embodied otherwise without departing from such principles.

What is claimed is:
1. A lens assembly for a camera comprising:
 (a) lens barrel means having operative components of said lens assembly mounted therewith and including an attachment face which interfaces with said camera during attachment thereto of said lens assembly;
 (b) bayonet coupling means adapted to be engaged and disengaged with complementary bayonet coupling means on said camera upon relative rotation therebetween for operatively mounting and dismounting said lens assembly on said camera; and
 (c) means for impeding mounting of said lens assembly on said camera when said lens assembly is misaligned relative to said camera during a mounting operation, said impeding means comprising a plurality of projection members provided on said attachment face for abutting against said complementary bayonet coupling means to prevent misaligned mounting of said lens assembly.

2. A lens assembly for a camera comprising:
 (a) lens barrel means having bayonet coupling means thereon for coupling said lens assembly with complementary bayonet coupling means on said camera for mounting and dismounting said lens assembly with said camera;
 (b) adapter means connected with said lens barrel means and being in rotatable relationship therewith, said adapter means being arranged to be restrained from rotational movement with said camera coupling means; and
 (c) means for preventing bayonet coupling of said lens assembly coupling means with said complementary coupling means on said camera, said preventing means operating to prevent bayonet coupling operation when said lens assembly is inclined relative to the camera.

3. A lens assembly according to claim 2 wherein said preventing means comprise a fixing face on said adapter means for mounting said lens barrel means, said fixing face being provided with at least two projecting members, said projecting members having a predetermined relative position relative to said lens assembly coupling means when said lens assembly is attached with said camera.

4. A lens assembly according to claims 2 or 3 further comprising:
 (a) retainer means adapted to cooperate with complementary retainer means on said camera for holding said adapter means rotatively fixed relative to said camera;
 (b) said lens assembly bayonet coupling means, said complementary coupling means on said camera and said retainer means being structured in accordance with the following relationship:

$$l_1 \geq l_2 \geq l_3$$

wherein
 $l_1$: is the width of the spacing between claws of said bayonet coupling means of said lens assembly;
 $l_2$: is the distance between any pair of said projecting members; and
 $l_3$: is the width of each claw of said complementary coupling means on said camera.

5. A lens assembly for a camera including attachment safety means comprising:
 (a) lens barrel means having bayonet coupling means thereon for coupling with complementary bayonet coupling means of said camera for enabling mounting and dismounting of said lens assembly on and from said camera;
 (b) adapter means connected with said lens barrel means and having said lens barrel means mounted in relative rotatable relationship therewith, said adapter means being arranged to be restrained from rotational movement relative to said camera, said adapter means having a fitting face for fitting said lens assembly in said camera;

(c) retainer means adapted to cooperate with complementary retainer means on said camera for holding said adapter means relatively fixed relative to said camera;

(d) means for holding in a predetermined position said lens barrel means and said adapter means; and (e) safety means for effecting a desired attachment operation of said lens assembly with said camera, said safety means comprising projection members provided on said adapter means;

(f) said safety means being structured in accordance with the following relationship:

$$l_1 \geq l_2 \geq l_3$$

wherein $l_1$: is the width of the spacing between claws of said bayonet coupling means of said lens assembly;

$l_2$: is the distance between any pair of said projecting members; and $l_3$: is the width of each claw of said complementary coupling means on said camera.

6. A lens assembly according to claim 5 wherein said safety means is further arranged so that said projecting members are disposed on said fitting face of said adapter means and so that said members are further disposed oppositely relative to the position of said claws of said bayonet coupling means of said lens assembly.

7. A lens assembly for a camera comprising:

(a) lens barrel means having operative components of said lens assembly mounted therewith;

(b) bayonet coupling means adapted to be engaged with and disengaged from complementary bayonet coupling means of said camera upon relative rotation therebetween for operatively mounting and dismounting said lens assembly and said camera; and (c) means for impeding mounting of said lens assembly on said camera when said lens assembly is misaligned relative to said camera during a mounting operation;

(d) said bayonet coupling means having bayonet claws having an inner side and an outer side and adapted to have bayonet claws of said complementary bayonet coupling means engaged therewith on said inner side for interlocking engagement to mount said lens assembly on said camera;

(e) said impeding means including pin means located to be spaced from said inner side of said bayonet claws of said bayonet coupling means a distance to define a gap therebetween through which claws of said complementary bayonet coupling means must pass to effect said interlocking engagement;

(f) said pin means being located to define said gap with a size to prevent mounting of said lens assembly when said lens assembly is not held with a required alignment to said camera.

8. A lens assembly according to claim 7 wherein said pin means are located in opposed relationship relative to said inner sides of said bayonet claws of said bayonet coupling means of said lens assembly, said pin means being angularly located relative to said bayonet claws to be located in proximity to the angular ends of said claws.

* * * * *

UNITED STATES PATENT OFFICE
CERTIFICATE OF CORRECTION

Patent No. 4,251,134           Dated   Feb. 17, 1981

Inventor(s)   Akira Sato, Takashi Isobe

It is certified that error appears in the above-identified patent and that said Letters Patent are hereby corrected as shown below:

In the heading of the Patent [30] reads as follows

[30]   Foreign Application Priority Data

Oct. 2, 1978        Japan.....53-135306

Signed and Sealed this

Twelfth Day of May 1981

[SEAL]

Attest:

RENE D. TEGTMEYER

Attesting Officer     Acting Commissioner of Patents and Trademarks